(12) United States Patent
Sakatani et al.

(10) Patent No.: US 7,967,901 B2
(45) Date of Patent: Jun. 28, 2011

(54) LUBRICATING LIQUID SEPARATOR

(75) Inventors: Toru Sakatani, Kobe (JP); Eiji Kanki, Hyogo (JP); Yasumasa Kimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 270 days.

(21) Appl. No.: 12/318,620

(22) Filed: Jan. 2, 2009

(65) Prior Publication Data

US 2009/0255406 A1   Oct. 15, 2009

(30) Foreign Application Priority Data

Apr. 14, 2008  (JP) ................. 2008-104493

(51) Int. Cl.
*B01D 45/16* (2006.01)
*B01D 46/42* (2006.01)

(52) U.S. Cl. .............. 96/381; 55/459.1; 96/384; 96/385

(58) Field of Classification Search ............. 96/380–388; 55/320, 459.1, DIG. 17

See application file for complete search history.

(56) References Cited

U.S. PATENT DOCUMENTS

| | | | | |
|---|---|---|---|---|
| 2,002,553 | A | * | 5/1935 | Somers ............ 96/232 |
| 4,050,237 | A | * | 9/1977 | Pall et al. .......... 60/39.08 |
| 4,050,913 | A | * | 9/1977 | Roach ............. 96/381 |
| 4,162,904 | A | * | 7/1979 | Clay et al. ......... 96/381 |
| 4,560,395 | A | * | 12/1985 | Davis ............. 96/381 |
| 7,141,101 | B2 | * | 11/2006 | Amann ............ 96/380 |

FOREIGN PATENT DOCUMENTS

| | | |
|---|---|---|
| JP | 47-26749 | 1/1971 |
| JP | 6-235572 | 8/1994 |
| JP | 08-128388 | 11/1994 |
| JP | 2005-098534 | 9/2003 |
| JP | 2007-327439 | 6/2006 |

OTHER PUBLICATIONS

Office Action from Chinese Patent Office dated Mar. 1, 2010.
Korean Intellectual Property Office Notice of Preliminary Rejection issued Mar. 8, 2011 in Korean Patent Application No. 10-2009-31710 (6 pages) including an English language translation (2 pages).

* cited by examiner

*Primary Examiner* — Richard L Chiesa
(74) *Attorney, Agent, or Firm* — Stites & Harbison PLLC; Juan Carlos A. Marquez, Esq.

(57) ABSTRACT

A lubricating liquid separator which can damp compressor pulsation noise effectively and improve the lubricating liquid separating performance without greatly enlarging the size of the separator itself. A demister having a sound absorbing performance is disposed on an outer periphery of a partition plate. Compressed gas which enters the interior of a housing through a compressed gas inlet port flows as rotating flow in a flow path between the partition plate and a portion of a side wall of the housing opposed to the partition plate. Pressure pulsation of the compressed gas is diminished by the demister, and a compressor pulsation noise by the rotating flow of the compressed gas is diminished by the sound absorption of the demister. Further, with the demister, reflection of the compressed gas at a wall surface of the partition plate is suppressed, and scattering of lubricating liquid separated from the compressed gas is suppressed.

3 Claims, 5 Drawing Sheets

FIG.5B

LUBRICATING LIQUID SEPARATOR

BACKGROUND OF THE INVENTION

1. Field of the Invention

The present invention relates to a lubricating liquid separator for separating and recovering lubricating liquid from compressed gas, the lubricating liquid being used, for example, in an oil-cooled air compressor, a freezer, a gas compressor or a water lubrication type air compressor.

2. Description of the Related Art

In screw type or scroll type air/gas compressors or freezers there is used such liquid as oil or water as both lubricant and rotor coolant for rotors in a compressing section, the rotors being in contact with each other. In these gas compressors, compressed gas is discharged in a mixed state with lubricating liquid, and therefore a lubricating liquid separator for separating and recovering lubricating liquid from the compressed gas is installed in each of the gas compressors.

The lubricating liquid separator is called an oil recovering device or an oil separator in case of the lubricating liquid being oil. And the lubricating liquid separator is called a water recovering device or a water separator in case of the lubricating liquid being water. According to the principle of the lubricating liquid separator, compressed gas is introduced so as to flow along the circumferential direction from a side surface of a cylindrical housing, and there is produced rotating flow of the compressed gas along an inner wall surface of the housing. By the resulting centrifugation effect, the lubricating liquid component is gathered on the inner wall surface of the housing for separation from the gaseous component.

The compressed gas freed from the lubricating liquid to a certain extent by the centrifugation effect is discharged from the lubricating liquid separator. At this time, the remaining lubricating liquid is usually removed by a metallic or fibrous lubricating liquid removing filter called demister. The demister is known to exhibit a predetermined sound absorbing performance.

In order to let the centrifugation effect be exhibited to a satisfactory extent, the longer the rotating flow created along the inner wall surface of the housing of the lubricating liquid separator, the better. Therefore, a compressed gas inlet port for introducing the compressed gas into the lubricating liquid separator is generally formed on an upper side of the housing of the lubricating liquid separator. However, since the precipitated lubricating liquid stays in a lower portion of the housing, a compressed gas discharge port for discharging the compressed gas from the lubricating liquid separator after separation of the lubricating liquid is also formed on the upper side of the housing. In view of this point, a cylindrical partition plate having a predetermined length in the vertical direction and which surrounds the compressed gas discharge port is in many cases installed within the housing, lest the compressed gas entering from the compressed gas inlet port and containing the lubricating liquid, and the compressed gas after separation of the lubricating oil and discharged from the compressed gas discharge port should mix each other.

In Patent Literature 1 there is disclosed a separator wherein a demister is disposed inside a partition plate. On the other hand, there also is a case where a demister is disposed so as to divide the interior of the housing into two vertically without using a partition plate.

[Patent Literature 1]
Japanese Patent Laid-Open Publication No. Sho 47 (1972)-26749

However, in the separator of Patent Literature 1, a compressor pulsation noise is generated within the housing as a result of entry of compressed gas involving pressure pulsation into the housing. Consequently, the separator itself acts as a noise source, contributing greatly to an increase of noise in a gas compressor or the like.

In this connection, in Patent Literature 2 is disclosed an oil separator in an oil-cooled compressor wherein a noise damping section is provided in the interior of a vessel to reduce noise, the noise damping section having a casing which encloses a vessel-inside opening of a gas inlet section and also having a gas-permeable, heat-resistant, sound-absorbing material layer disposed at a position opposed to the opening.

In Patent Literature 3 is disclosed an oil separator wherein a member for inducing a pressure loss is disposed near a tip of a coolant inlet pipe, allowing oil contained in a mixed fluid to be adsorbed to the member, and the flow velocity of the mixed fluid is adjusted appropriately by the member, thereby suppressing noise generated upon collision of fluid with an inner wall of a vessel body.

Further, in Patent Literature 4 is disclosed an oil separator wherein a sound absorbing material is disposed at a position lower than a gas inlet port in the interior of a vessel not having a partition plate and at a position at least an upper surface of the sound absorbing material is not soaked into oil stored in an oil sump, thereby reducing generated noise. This oil separator is superior in oil separating performance and does not deteriorate the operation efficiency of the associated compressor. In this oil separator, there is disposed a demister so as to divide the interior of the vessel body into two vertically.

[Patent Literature 2]
Japanese Patent Laid-Open Publication No. Hei 8 (1996)-128388
[Patent Literature 3]
Japanese Patent Laid-Open Publication No. 2005-98534
[Patent Literature 4]
Japanese Patent Laid-Open Publication No. 2007-327439

The demister exhibits a sound absorbing performance to a certain extent, but even if the demister is disposed as in Patent Literatures 1 and 4, there is obtained little noise damping effect. Even if the demister is disposed outside a lubricating liquid separator, there will be obtained no noise damping effect, because the demister is not designed as a noise damper.

In the oil separator of an oil-cooled compressor disclosed in Patent Literature 2, an increase in the number of parts results from provision of the noise damping section within the vessel, thus giving rise to the problem of increase in cost. In the oil separator disclosed in Patent Literature 3, some improvement is needed so that the pressure loss inducing member disposed near the tip of the coolant inlet pipe may not be scattered by the discharge gas of a high pressure.

In the oil separator disclosed in Patent Literature 4, because the partition plate is not provided, scattering of the lubricating liquid after separation from the compressed gas which enters the interior of the housing is conspicuous, thus giving rise to the problem that the separation efficiency becomes lower.

Moreover, in the lubricating liquid separator which utilizes the centrifugation effect, it is necessary to enlarge the vertical length of the housing in order to enhance the separation efficiency. As a result, not only the cost of the lubricating liquid separator itself increases, but also there arises the problem of space when disposing the associated compressor body and the lubricating liquid separator within a single package.

Further, as disclosed in Patent Literature 1, if a demister is disposed inside a partition plate, there arises the problem of lowering in efficiency of the gas compressor due to an increase of pressure loss. On the other hand, if there is formed such a flow path as extends through a demister, it will be impossible to expect the demister to exhibit any noise damping effect; besides, the demister cannot play its original role.

SUMMARY OF THE INVENTION

It is an object of the present invention to provide a lubricating liquid separator capable of damping a compressor pulsation noise effectively and improving the lubricating liquid separating performance without greatly enlarging the size of the separator itself.

According to the present invention, there is provided a lubricating liquid separator for separating and recovering lubricating liquid from compressed gas containing the lubricating liquid by creating rotating flow of the compressed gas, the lubricating liquid separator comprising a hollow housing; a compressed gas inlet port formed in a side wall of the housing and through which the compressed gas containing the lubricating liquid passes when flowing into the housing; a compressed gas discharge port formed in an upper wall of the housing and through which the compressed gas after separation of the lubricating liquid passes when discharged from the interior of the housing; a partition plate disposed in the interior of the housing and having a predetermined length in the vertical direction, the partition plate being connected to the upper wall of the housing and enclosing the compressed gas discharge port; and a lubricating liquid removing filter disposed on an outer surface side of the partition plate or on a portion of the side wall opposed to the partition plate, the lubricating liquid removing filter having a sound absorbing performance and functioning to remove the lubricating liquid from the compressed gas containing the lubricating liquid.

According to the above structure, the lubricating liquid removing filter for removing the lubricating liquid from the compressed gas which enters the interior of the housing through the compressed gas inlet port is disposed on the outer surface side of the partition plate or on the portion of side wall of the housing opposed to the partition plate. Consequently, pressure pulsation of the compressed gas which enters the interior of the housing and which flows as rotating flow in a flow path formed between the partition plate and the portion of side wall opposed to the partition plate is diminished by the lubricating liquid removing filter, and a compressor pulsation noise caused by the rotating flow of the compressed gas in the flow path is diminished by the sound absorbing performance of the lubricating liquid removing filter. Besides, with the lubricating liquid removing filter, reflection of the compressed gas at the wall surfaces of the housing and the partition plate is suppressed, and scattering of the lubricating liquid separated from the compressed gas is suppressed thereby, so that the rotating flow of the compressed gas become smooth and the lubricating liquid separating performance is improved. Consequently, it is possible to damp the compressor pulsation noise effectively and improve the separation performance without greatly enlarging the size of the separator itself.

In the lubricating liquid separator of the present invention, the lubricating liquid removing filter may be disposed on each of the outer surface side of the partition plate and the portion of side wall opposed to the partition plate. According to this structure, since the lubricating liquid removing filter is disposed on both the outer surface side of the partition plate and the portion of side wall of the housing opposed to the partition plate, pressure pulsation of the compressed gas which flows as rotating flow in the flow path formed between the partition plate and the portion of side wall opposed to the partition plate can be further diminished. Besides, the compressor pulsation noise caused by the rotating flow of the compressed gas in the flow path can be further diminished by the sound absorbing performance of the lubricating liquid removing filter. Moreover, with the lubricating liquid removing filter, reflection of the compressed gas at the wall surfaces of the housing and the partition plate is further suppressed, and scattering of the lubricating liquid separated from the compressed gas is further suppressed, so that the rotating flow of the compressed gas can be made smoother, and the lubricating liquid separating performance can be further improved.

In the lubricating liquid separator of the present invention, the lubricating liquid removing filter may be disposed on the portion of side wall opposed to the partition plate and a lower end of the lubricating liquid removing filter may be positioned at a height equal to or lower than a lower end of the partition plate. According to this structure, since the lower end of the lubricating liquid removing filter disposed on the portion of side wall of the housing opposed to the partition plate is positioned at a height equal to or lower than the lower end of the partition plate, pressure pulsation of the compressed gas which flows as rotating flow in the flow path formed between the partition plate and the portion of side wall opposed to the partition plate can be suitably diminished in the area from the compressed gas inlet port to a lower end of the flow path. Besides, a compressor pulsation noise caused by the rotating flow of the compressed gas in the flow path can be diminished thoroughly in the area from the compressed gas inlet port to the lower end of the flow path. Moreover, with the lubricating liquid removing filter, reflection of the compressed gas at the housing wall surface is suitably suppressed in the area from the compressed gas inlet port to the lower end of the flow path and scattering of the lubricating liquid separated from the compressed gas is thereby suppressed to a satisfactory extent. Therefore, the rotating flow of the compressed gas can be made smoother and it is possible to further improve the lubricating liquid separating performance.

DESCRIPTION OF THE PREFERRED EMBODIMENTS

Lubricating liquid separators embodying the present invention will be described below with reference to the accompanying drawings.

First Embodiment

Figure 1A:
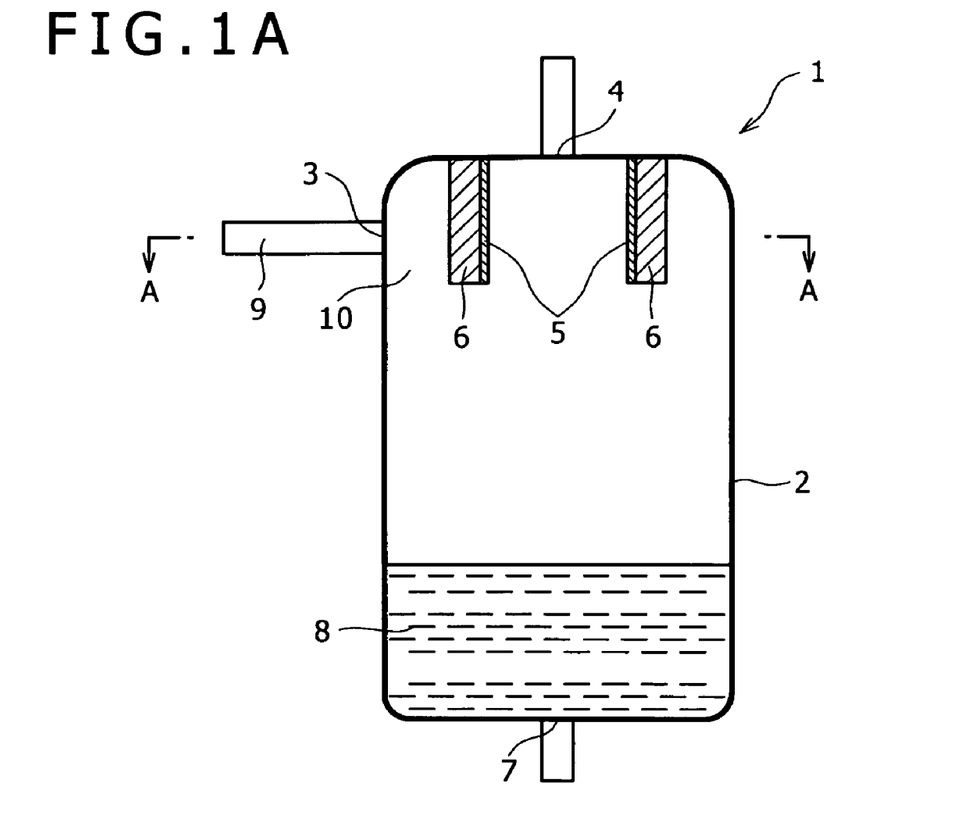
FIG. 1A is a sectional view of a lubricating liquid separator according to an embodiment of the present invention.

A lubricating liquid separator 1 according to a first embodiment of the present invention will be described below with reference to FIG. 1.
(Structure of the Lubricating Liquid Separator 1)

The lubricating liquid separator 1 constitutes a part of a gas compressor together with a compressor body (not shown). As shown in FIG. 1, the lubricating liquid separator 1 has a cylindrical housing 2 made of metal or resin having pressure resistance. The housing 2 is installed in a vertically (longitudinally) upright state. The shape of the housing 2 is not limited to the cylindrical shape, but may be an elliptic shape or a polygonal prism shape. The housing 2 has a compressed gas inlet port 3 formed in a side wall thereof. Further, a lubricating oil sump portion 8 is formed at an inside bottom of the housing 2.

The compressed gas inlet port 3 is connected through a gas inlet pipe 9 to a discharge port (not shown) of a compressor body. Compressed gas compressed by the compressor body and containing lubricating liquid passes through the compressed gas inlet port 3 and enters the interior of the housing 2. As shown in FIG. 1B which is a sectional view taken on line A-A in FIG. 1A, the compressed gas inlet port 3 is formed so as to be parallel to a tangent to the peripheral surface of the cylindrical housing 2. Consequently, the compressed gas which passes through the compressed gas inlet port 3 flows from a side face portion of the housing 2 into the housing 2 along the circumferential direction, resulting in creation of rotating flow of the compressed gas along the inner wall surface of the housing 2. With this rotating flow, a centrifugation effect (cyclone effect) is induced in the compressed gas. As shown in FIG. 1A, the compressed gas inlet port 3 is located at an upper position in the longitudinal direction of the housing 2. As a result, the rotating flow of the compressed gas becomes longer and the centrifugation effect for separating the lubricating liquid is exhibited to a satisfactory extent.

Moreover, a compressed gas discharge port 4 is formed in a top wall of the housing 2, through which the compressed gas separated from the lubricating liquid is discharged. The compressed gas discharged from the compressed gas discharge port 4 is conveyed to the next process.

In the interior of the housing 2 is disposed a cylindrical partition plate 5 having a predetermined length in the vertical direction, connected to the top wall of the housing 2 and enclosing the compressed gas discharge port 4. A lower end of the partition plate 5 is positioned lower than the compressed gas inlet port 3. And the compressed gas inlet port 3 and the compressed gas discharge port 4 are consequently partitioned from each other by the partition plate 5, whereby the compressed gas entering from the compressed gas inlet port 3 and containing lubricating liquid and the compressed gas discharged from the compressed gas discharge port 4 and freed from the lubricating liquid are prevented from being mixed with each other. The shape of the partition plate 5 is not limited to the cylindrical shape, but may be an elliptic shape or a polygonal prism shape.

A lubricating liquid removing filter (demister) 6 is mounted on an outer surface side of the partition plate 5 to remove lubricating liquid from the compressed gas which contains the lubricating liquid. The demister 6 is formed of a metallic or resinous, fibrous, porous material, and has a sound absorbing performance. With the demister 6 thus mounted on the outer surface side of the partition plate 5, reflection of the compressed gas at the wall surface of the partition plate 5 is suppressed, and scattering of the lubricating liquid separated from the compressed gas is suppressed thereby. Besides, since the demister 6 does not obstruct the rotating flow of the compressed gas, there is no fear of lowering in efficiency of the gas compressor caused by increase of a pressure loss.

A lower end of the demister 6 is positioned at a height equal to or higher than the lower end of the partition plate 5, whereby the lubricating liquid adhered to the demister 6 is prevented from being discharged from the compressed gas discharge port 4 together with the compressed gas after separation of lubricating liquid.

The demister 6 may be disposed not on the outer surface side of the partition plate 5 but on the portion of side wall of the housing 2 opposed to the partition plate 5. As to this structure, a description will be given below in a second embodiment of the present invention.

In a bottom wall of the housing 2, which is the bottom of the lubricating liquid sump portion 8, there is formed a lubricating liquid discharge port 7. The lubricating liquid discharge port 7 is for recovering the lubricating liquid stored in the lubricating liquid sump portion 8. The lubricating liquid recovered from the lubricating liquid sump portion 8 is returned to the compressor body.

(Operation of the Lubricating Liquid Separator 1)

The following description is now provided about the operation of the lubricating liquid separator 1.

Since the compressed gas inlet port 3 and the compressed gas discharge port 4 are partitioned from each other by the partition plate 5, the lubricating liquid-containing compressed gas which enters the interior of the housing 2 from the compressor body through the compressed gas inlet port 3 passes through a flow path 10 formed between the demister 6 and a portion of the housing 2 opposed to the demister 6. Therefore, the lubricating liquid-containing compressed gas which enters the interior of the housing 2 is never mixed with the compressed gas which is discharged from the compressed gas discharge port 4 after separation of lubricating liquid.

In the flow path 10, rotating flow along the inner wall surface of the cylindrical housing 2 is created in the compressed gas, whereby a centrifugation effect (cyclone effect) is developed in the compressed gas. As a result, lubricating liquid is separated from the compressed gas. In this connection, the compressed gas flowing as rotating flow in the flow path 10 strikes against the demister 6, whereby pressure pulsation of the compressed gas is diminished. At the same time, a compressor pulsation noise caused by the rotating flow of the compressed gas is diminished by the sound absorbing performance of the demister 6.

The compressed gas freed from the lubricating liquid by the rotating flow passes through the demister 6, whereby the lubricating liquid is further removed. In this case, with the demister 6, reflection of the compressed gas at the wall surface of the partition plate 5 is suppressed, and scattering of the lubricating liquid separated from the compressed gas is suppressed thereby. Consequently, the rotating flow of the compressed gas becomes smooth and the lubricating liquid separating performance is improved. Moreover, since the demister 6 does not obstruct the rotating flow of the compressed gas, there is no fear of lowering in efficiency of the gas compressor caused by increase of a pressure loss.

The lubricating liquid separated from the compressed gas adheres to an inner wall surface of the side wall of the housing 2. As a result, droplets of the lubricating liquid grow on the wall surface, and the thus-grown droplets flow down along the wall surface of the housing 2 by their own weights, so that the lubricating liquid accumulates in the lubricating liquid sump portion 8.

On the other hand, the compressed gas after separation of the lubricating liquid is discharged from the compressed gas discharge port 4, and is conveyed to the next process.

Thus, the demister 6 for removing the lubricating liquid from the compressed gas which enters the interior of the housing 2 through the compressed gas inlet port 3 is disposed on the outer surface side of the partition plate 5. Therefore, pressure pulsation of the compressed gas entering the interior of the housing 2 and flowing rotationally in the flow path 10 defined between the partition plate 5 and the portion of side wall of the housing 2 opposed to the partition plate 5 is diminished by the demister 6, and a compressor pulsation noise caused by the rotating flow of the compressed gas in the flow path 10 is diminished by the sound absorbing performance of the demister 6. Further, reflection of the compressed gas at the wall surface of the partition plate 5 is suppressed by the demister 6, and scattering of the lubricating liquid separated from the compressed gas is suppressed thereby, so that the rotating flow of the compressed gas becomes smooth and the lubricating liquid separating performance is improved. Consequently, it is possible to damp the compressor pulsation noise effectively and improve the lubricating liquid separating performance without greatly enlarging the size of the separator itself.

(Experimental Results)

Figure 2:
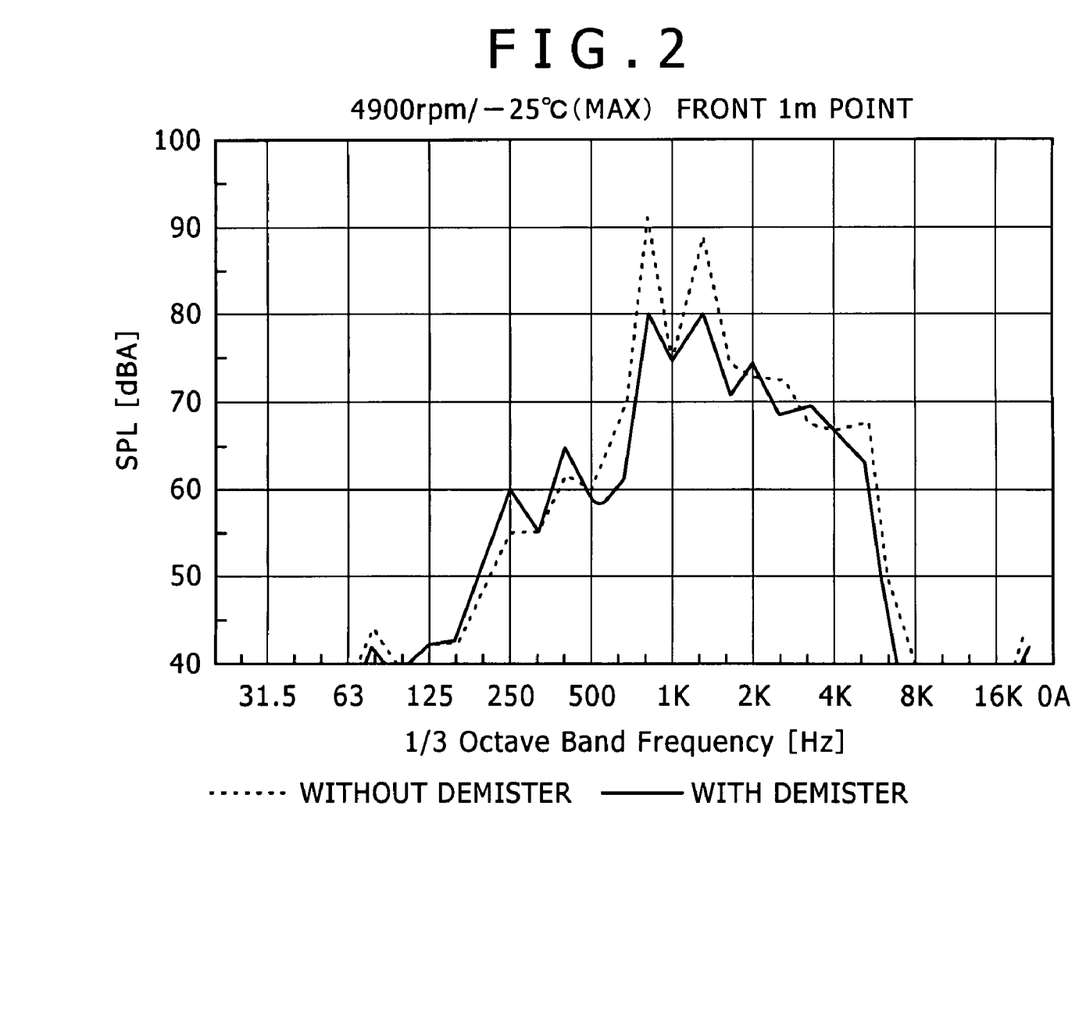
FIG. 2 is a graph showing experimental results.

FIG. 2 shows experimental results obtained by comparing a noise level at a 1 m-spaced position from a lubricating liquid separator of a conventional structure and, the noise level 1 m-spaced from the lubricating liquid separator 1 of this embodiment. The conventional lubricating liquid separator is of a structure not having the demister 6 in the lubricating liquid separator 1 shown in FIG. 1.

From FIG. 2 it is seen that the provision of the demister 6 on the outer surface side of the partition plate 5 leads to lowering of the noise level.

Outline of this Embodiment

In the lubricating liquid separator 1 of this embodiment, as described above, lubricating liquid is separated and recovered from compressed gas containing the lubricating liquid by creating rotating flow of the compressed gas. The lubricating separator 1 comprises a hollow housing 2, a compressed gas inlet port 3 formed in a side wall of the housing 2 and through which the compressed gas containing the lubricating liquid passes when flowing into the housing 2, a compressed gas discharge port 4 formed in a top wall of the housing 2 and through which the compressed gas after separation of the lubricating liquid passes when discharged from the interior of the housing 2, a partition plate 5 disposed in the interior of the housing 2 and having a predetermined length in the vertical direction, the partition plate 5 being connected to the top wall of the housing 2 and enclosing the compressed gas discharge port 4, and a lubricating liquid removing filter (demister 6) disposed on an outer surface side of the partition plate 5 or on a portion of the side wall of the housing 2 opposed to the partition plate 5, the lubricating liquid removing filter having a sound absorbing performance and functioning to remove the lubricating liquid from the compressed gas containing the lubricating liquid.

According to this structure, the lubricating liquid removing filter for removing lubricating liquid from the compressed gas which enters the interior of the housing 2 through the compressed gas inlet port 3 is disposed on an outer surface side of the partition plate 5 or on the portion of side wall of the housing 2 opposed to the partition plate 5. Therefore, pressure pulsation of the compressed gas which enters the interior of the housing 2 and which flows as rotating flow in the flow path 10 formed between the partition plate 5 and the portion of side wall of the housing 2 opposed to the partition plate 5 is diminished by the lubricating liquid removing filter, and a compressor pulsation noise caused by the rotating flow of the compressed gas in the flow path 10 is diminished by the sound absorbing performance of the lubricating liquid removing filter. Moreover, reflection of compressed gas at the wall surfaces of the housing 2 and the partition plate 5 is suppressed by the lubricating liquid removing filter, and scattering of the lubricating liquid separated from the compressed gas is suppressed thereby, so that the rotating flow of the compressed gas become smooth, and the lubricating liquid separating performance is improved. Consequently, it is possible to damp the compressor pulsation noise effectively and improve the lubricating liquid separating performance without greatly enlarging the size of the separator itself.

Second Embodiment

A lubricating liquid separator 21 according to a second embodiment of the present invention will be described below with reference to FIG. 3.

(Structure of the Lubricating Liquid Separator 21)

Figure 3A:
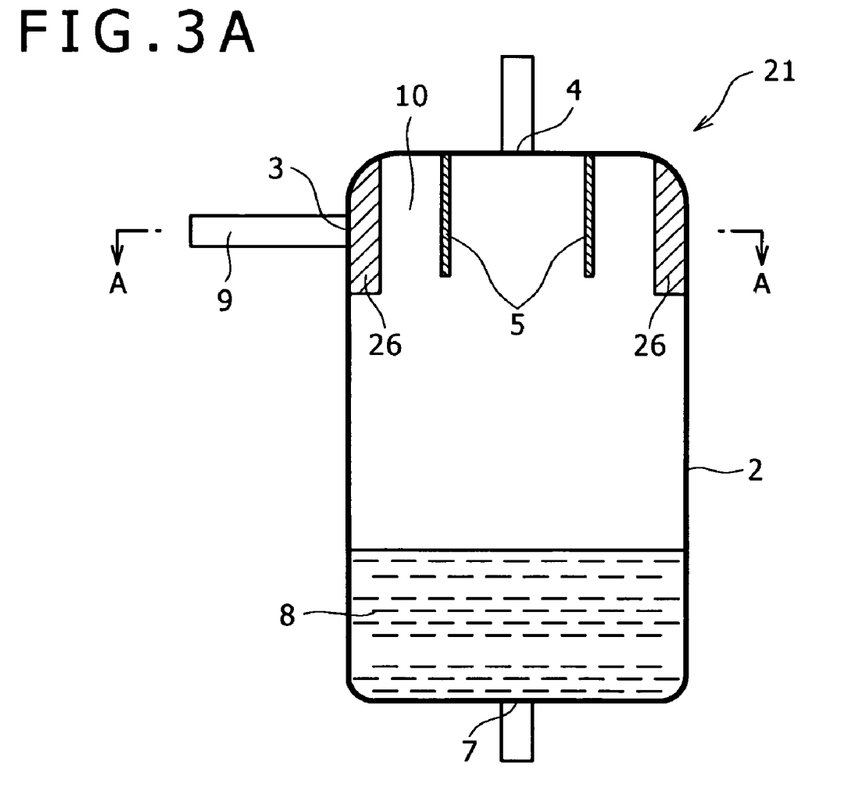
FIG. 3A is a sectional view of a lubricating oil separator according to another embodiment of the present invention.
Figure 3B:
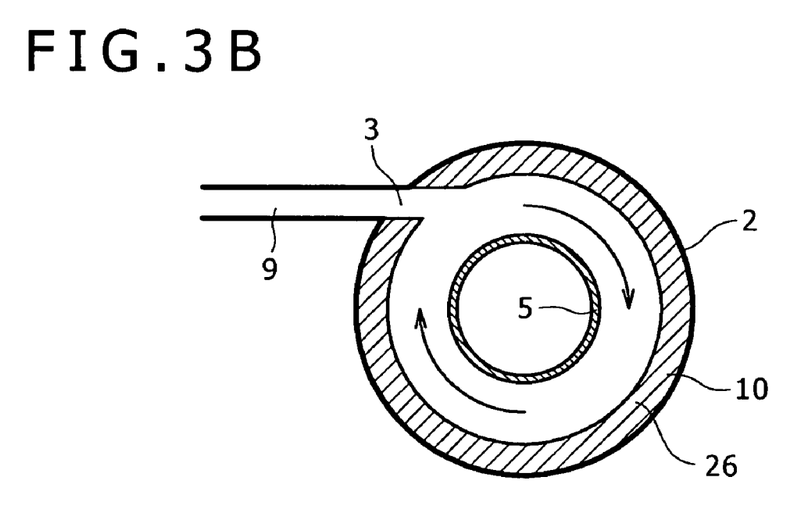
FIG. 3B is a sectional view taken on line A-A in FIG. 3A.

As shown in FIG. 3, the lubricating liquid separator 21 of this second embodiment is different from the first embodiment in that a demister 26 is disposed on a portion of a side wall of the housing 2 opposed to the partition plate 5.

As shown in FIG. 3A, the demister 26 is disposed so that a lower end thereof is positioned lower than the lower end of the partition plate 5. The lower end of the demister 26 may be positioned at a height equal to the lower end of the partition plate 5. As shown in FIG. 3B, which is a sectional view taken on line A-A in FIG. 3A, the demister 26 is disposed so as not to block the compressed gas inlet port 3. With this arrangement, pressure pulsation of the compressed gas which flows as rotating flow in a flow path 10 formed between the partition plate 5 and the portion of side wall of the housing 2 opposed to the partition plate is diminished suitably in the area from the compressed gas inlet port 3 to a lower end of the flow path 10. Besides, a compressor pulsation noise caused by the rotational flow of the compressed gas in the flow path 10 is diminished to a satisfactory extent in the area from the compressed gas inlet port 3 to the lower end of the flow path 10. Moreover, with the demister 26, reflection of the compressed gas at the wall surface of the housing 2 is suppressed suitably in the area from the compressed gas inlet port 3 to the lower end of the flow path 10, and scattering of the lubricating liquid separated from the compressed gas is suppressed to a satisfactory extent thereby. Consequently, the rotating flow of the compressed gas becomes smoother and the lubricating liquid separating performance is further improved. Further, since the demister 26 does not obstruct the rotating flow of the compressed gas, there is no fear of lowering in efficiency of the gas compressor caused by increase of a pressure loss.

Other structural points are the same as in the first embodiment and therefore an explanation thereof will here be omitted.

(Operation of the Lubricating Liquid Separator 21)

The operation of the lubricating liquid separator 21 of this embodiment is different from that of the first embodiment in that, with the demister 26, reflection of the compressed gas at the portion of side wall of the housing 2 opposed to the partition plate 5 is suppressed, and scattering of the lubricating liquid separated from the compressed gas is suppressed thereby. As a result, the rotating flow of the compressed gas becomes smooth, and the lubricating liquid separating performance is improved.

Other points related to operation are the same as in the first embodiment and therefore an explanation thereof will here be omitted.

Thus, the demister 26 for removing lubricating liquid from the compressed gas which enters the interior of the housing 2 through the compressed gas inlet port 3 is disposed on the portion of side wall of the housing 2 opposed to the partition plate 5. Consequently, pressure pulsation of the compressed gas entering the interior of the housing 2 and flowing as rotating flow in the flow path 10 formed between the partition plate 5 and the portion of side wall opposed to the partition plate 5 is diminished by the demister 26, and a compressor pulsation noise caused by the rotating flow of the compressed gas in the flow path 10 is diminished by the sound absorbing performance of the demister 26. Further, with the demister 26, reflection of the compressed gas at the wall surface of the housing 2 is suppressed, and scattering of the lubricating liquid separated from the compressed gas is suppressed thereby, so that the rotating flow of the compressed gas becomes smooth and the lubricating liquid separating performance is improved. Thus, it is possible to damp the compressor pulsation noise effectively and improve the lubricating liquid separating performance without greatly enlarging the size of the separator itself.

Besides, since the lower end of the demister 26 disposed on the portion of side wall of the housing 2 opposed to the partition plate 5 is positioned at a height equal to or lower than the lower end of the partition plate 5, not only pressure pulsation of the compressed gas which flows as rotating flow in the flow path 10 formed between the partition plate 5 and the portion of side wall opposed to the partition plate 5 can be diminished suitably in the area from the compressed gas inlet port 3 to the lower end of the flow path 10, but also a compressor pulsation noise induced by the rotating flow of the compressed gas in the flow path 10 can be diminished to a satisfactory extent in the area from the compressed gas inlet port 3 to the lower end of the flow path 10. Moreover, with the demister 26, reflection of the compressed gas at the wall surface of the housing 2 is suppressed suitably in the area from the compressed gas inlet port 3 to the lower end of the flow path 10, and scattering of the lubricating liquid separated from the compressed gas is suppressed thereby to a satisfactory extent, so that the rotating flow of the compressed gas can be made smoother and it is possible to further improve the lubricating liquid separating performance.

Outline of this Embodiment

In the lubricating liquid separator 21 of this embodiment, as described above, a lubricating liquid removing filter (demister 26) is disposed on a portion of a side wall of the housing opposed to the partition plate 5 and its lower end is positioned at a height equal to or lower than the lower end of the partition plate 5.

According to this structure, since the lower end of the lubricating liquid removing filter disposed on the portion of side wall of housing 2 opposed to the partition plate 5 is positioned at a height equal to or lower than the lower end of the partition plate 5, not only pressure pulsation of the compressed gas which flows as rotating flow in the flow path 10 formed between the partition plate 5 and the portion of side wall opposed to the partition plate 5 can be diminished suitably in the area from the compressed gas inlet port 3 to the lower end of the flow path 10, but also a compressor pulsation noise induced by the rotating flow of the compressed gas in the flow path 10 can be diminished to a satisfactory extent in the area from the compressed gas inlet port 3 to the lower end of the flow path 10. Moreover, with the lubricating liquid removing filter, reflection of the compressed gas at the wall surface of the housing 2 is suppressed suitably in the area from the compressed gas inlet port 3 to the lower end of the flow path 10, and scattering of the lubricating liquid separated from the compressed gas is suppressed thereby to a satisfactory extent. Consequently, it is possible to further smooth the rotating flow of the compressed gas and further improve the lubricating liquid separating performance.

Third Embodiment

A lubricating liquid separator 31 according to a third embodiment of the present invention will be described below with reference to FIG. 4.

(Structure and Operation of the Lubricating Liquid Separator 31)

Figure 4A:
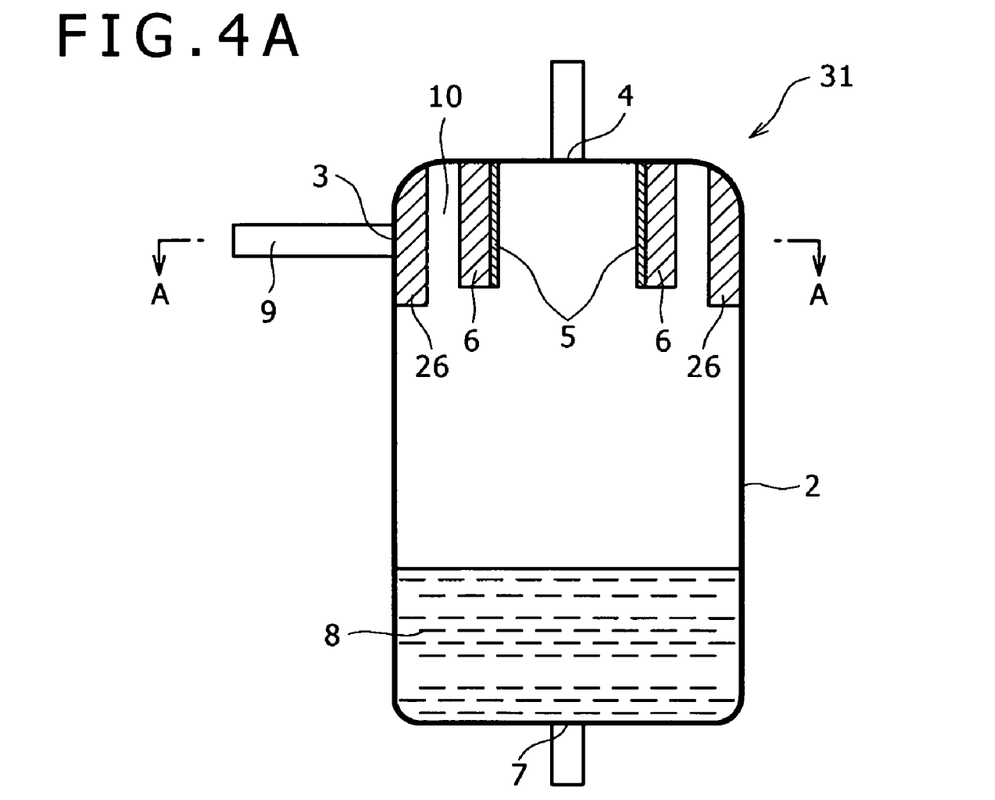
FIG. 4A is a sectional view of a lubricating liquid separator according to a further embodiment of the present invention.
Figure 4B:
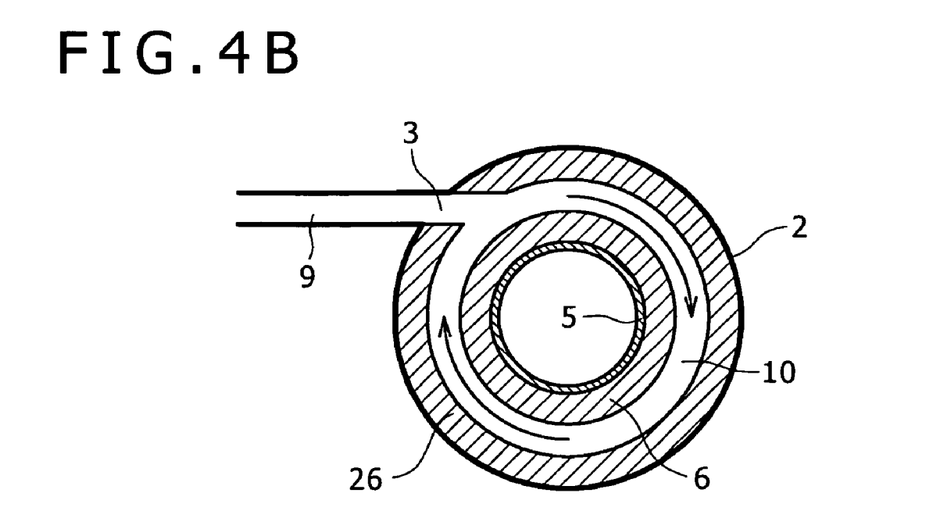
FIG. 4B is a sectional view taken on line A-A in FIG. 4A.

As shown in FIG. 4, the lubricating liquid separator 31 of this third embodiment is different from the first and second embodiments in that the demister 6 is disposed on the outer surface side of the partition plate 5 and that the demister 26 is disposed on a portion of a side wall of the housing 2 opposed to the partition plate 5.

As shown in FIG. 4A, the demister 26 is disposed so that its lower end is positioned lower than the lower end of the partition plate 5. The lower end of the demister 26 may be positioned at a height equal to the lower end of the partition plate 5. As shown in FIG. 4B, which is a sectional view taken on line A-A in FIG. 4A, the demister 26 is disposed so as not to block the compressed gas inlet port 3.

Other points related to structure and operation are the same as in the other embodiments and therefore an explanation thereof will here be omitted.

Thus, since the demisters 6 and 26 are disposed respectively on the outer surface side of the partition plate 5 and on the portion of side wall of the housing 2 opposed to the partition plate 5, it is possible to obtain more outstanding effects than in the other embodiments. More particularly, not only pressure pulsation of the compressed gas which flows as rotating flow in the flow path 10 formed between the partition plate 5 and the portion of side wall opposed to the partition plate 5 can be further diminished, but also a compressor pulsation noise induced by the rotating flow of the compressed gas in the flow path 10 can be further diminished by the sound absorbing performance of the demisters 6 and 26. Besides, with the demister 6 and 26, reflection of the compressed gas at the wall surfaces of the housing 2 and the partition plate 5 is further suppressed, and scattering of the lubricating liquid separated from the compressed gas is further suppressed thereby, so that the rotating flow of the compressed gas can be made smoother, and it is possible to further improve the lubricating liquid separating performance.

Moreover, since the lower end of the demister 26 disposed on the portion of side wall of the housing 2 opposed to the partition plate 5 is positioned at a height equal to or lower than the lower end of the partition plate 5, not only pressure pulsation of the compressed gas which flows as rotating flow in the flow path 10 formed between the partition plate 5 and the portion of side wall opposed to the partition plate 5 can be diminished suitably in the area from the compressed gas inlet port 3 to the lower end of the flow path 10, but also a compressor pulsation noise induced by the rotating flow of the compressed gas in the flow path 10 can be diminished to a satisfactory extent in the area from the compressed gas inlet port 3 to the lower end of the flow path 10. Further, with the demister 26, reflection of the compressed gas at the wall surface of the housing 2 is suppressed suitably in the area from the compressed gas inlet port 3 to the lower end of the flow path 10, and scattering of the lubricating liquid separated from the compressed gas is suppressed thereby to a satisfactory extent. Consequently, the rotating flow of the compressed gas can be made smoother, and it is possible to further improve the lubricating liquid separating performance.

Outline of this Embodiment

Thus, according to the structure of the lubricating liquid separator 31 of this embodiment, the lubricating liquid removing filters (demisters 6, 26) are disposed respectively on the outer surface side of the partition plate 5 and on the portion of side wall opposed to the partition plate 5.

According to the structure described above, since the lubricating liquid removing filters are disposed respectively on the outer surface side of the partition plate 5 and on the portion of side wall of the housing 2 opposed to the partition plate 5, pressure pulsation of the compressed gas which flows rotationally in the flow path 10 formed between the partition plate 5 and the portion of side wall opposed to the partition plate 5 can be further diminished. Besides, a compressor pulsation noise induced by the rotating flow of the compressed gas in the flow path 10 can be further diminished by the sound absorbing performance of the lubricating liquid removing filter. Moreover, with the lubricating liquid removing filter, reflection of the compressed gas at the wall surfaces of the housing 2 and the partition plate 5 is further suppressed, and scattering of the lubricating liquid separated from the compressed gas is further suppressed thereby, so that the rotating flow of the compressed gas can be made smoother, and it is possible to further improve the lubricating liquid separating performance.

Modifications of the Embodiments

Although embodiments of the present invention are described above, they are mere illustrations of concrete examples and do not limit the present invention. As to their concrete structures, design modifications may be made where required. Further, the functions and effects described in the above embodiments are mere enumerations of most suitable functions and effects which are brought about by the present invention. The functions and effects of the present invention are not limited to those described in the above embodiments.

Figure 1B:
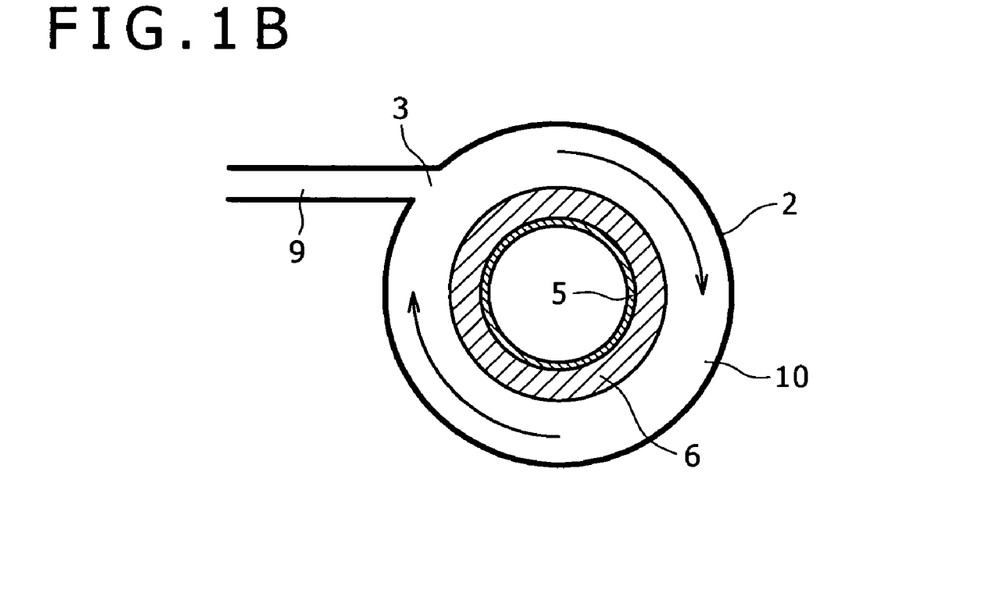
FIG. 1B is a sectional view taken on line A-A in FIG. 1A.
Figure 5A:
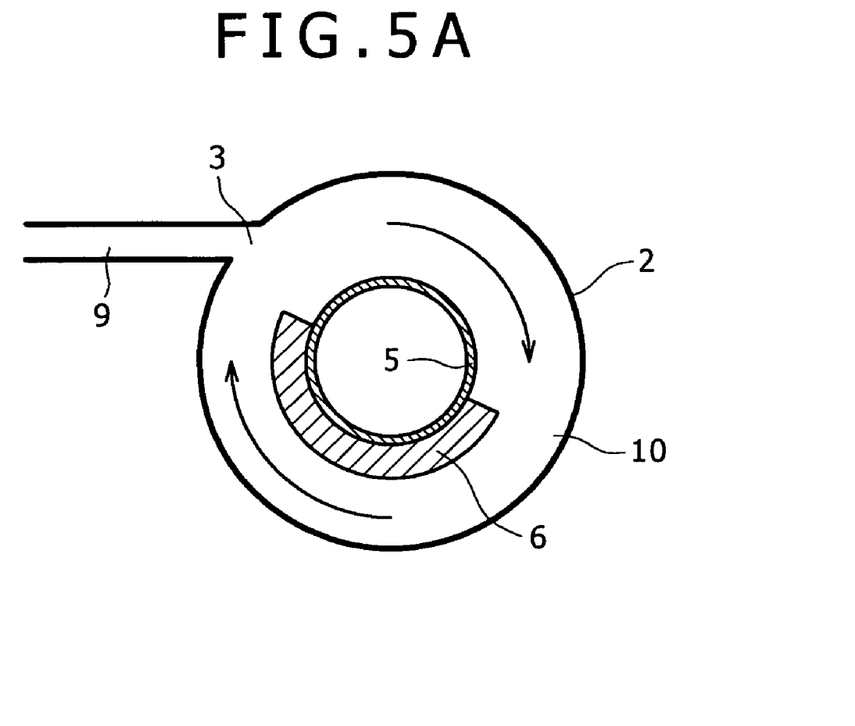
FIG. 5A is a sectional view taken on line A-A in FIG. 1A.
Figure 5B:
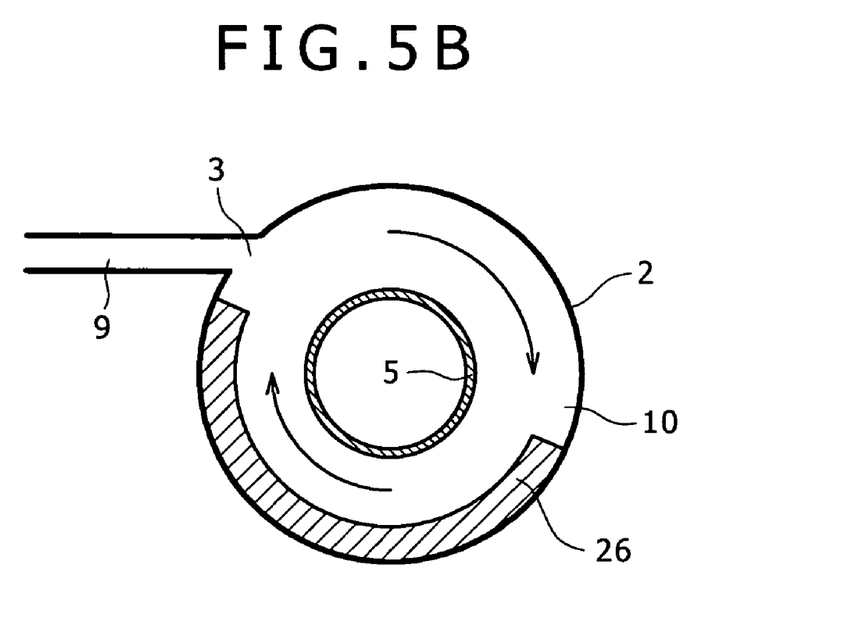
FIG. 5B is a sectional view taken on line A-A in FIG. 3A.

For example, in the first embodiment, although the demister 6 is disposed throughout the whole circumference on the outer surface side of the partition plate 5 as shown in FIG. 1B, no limitation is made to this structure. The demister 6 may be disposed in a limited area on the outer surface side of the partition plate 5 as shown in FIG. 5A which is a sectional view taken on line A-A in FIG. 1A. Further, in the second embodiment, although the demister 26 is disposed throughout the whole circumference of the portion of side wall of the housing 2 opposed to the partition plate 5 as shown in FIG. 3B, no limitation is made to this structure. As shown in FIG. 5B which is a sectional view taken on line A-A in FIG. 3A, the demister 26 may be disposed in a limited area of the portion of side wall of the hosing 2 opposed to the partition plate 5. This is also true of the third embodiment.

What is claimed is:

1. A lubricating liquid separator, comprising:
a hollow housing;
a compressed gas inlet port formed in a side wall of said housing and through which the compressed gas containing a lubricating liquid passes when flowing into said housing;
said compressed gas inlet port configured to establish a rotational flow of said compressed gas within said housing;
a compressed gas discharge port formed in an upper wall of said housing and through which the compressed gas after separation of the lubricating liquid passes when discharged from an interior of said housing;
a partition plate disposed in the interior of said housing and having a predetermined length in a vertical direction, said partition plate being connected to the upper wall of said housing and enclosing said compressed gas discharge port; and
a lubricating liquid removing filter disposed on an outer surface side of said partition plate or on a portion of the side wall opposed to said partition plate, said lubricating liquid removing filter having a sound absorbing performance and functioning to remove the lubricating liquid from the compressed gas containing the lubricating liquid.

2. A lubricating liquid separator according to claim 1, wherein said lubricating liquid removing filter is disposed on each of the outer surface side of said partition plate and the portion of the side wall opposed to said partition plate.

3. A lubricating liquid separator according to claim 1, wherein said lubricating liquid removing filter is disposed on the portion of the side wall opposed to said partition plate, and a lower end of said lubricating liquid removing filter is positioned at a height equal to or lower than a lower end of said partition plate.

* * * * *